United States Patent [19]

Samokovliski et al.

[11] 4,049,172
[45] Sept. 20, 1977

[54] PLANETARY WIRE-FEEDING MECHANISM FOR ELECTRIC ARC-WELDING APPLICATIONS

[75] Inventors: David Albert Samokovliski; Petko Kostadinov Grozdanov; Alfred Emmerich Nemechek; Peter Dimitrov Petrov; Simeon Georgiev Punchev, all of Sofia, Bulgaria

[73] Assignee: Institute po Zavaryavane, Sofia, Bulgaria

[21] Appl. No.: 726,412

[22] Filed: Sept. 24, 1976

[30] Foreign Application Priority Data

Sept. 24, 1975  Bulgaria .................................. 31062

[51] Int. Cl.² ........................................... B65H 17/22
[52] U.S. Cl. ...................................... 226/90; 226/91; 226/176; 226/187; 214/339
[58] Field of Search ................... 226/90, 91, 176, 187; 214/338, 339

[56] References Cited

U.S. PATENT DOCUMENTS 1,355,616  10/1920  Mohn ..................................... 214/339
3,517,844  6/1970  Wloszek ................................ 214/338

Primary Examiner—Richard A. Schacher

[57] ABSTRACT

An improved planetary-type wire-feeding mechanism including a pair of cooperating skewed rollers for advancing the wire is disclosed. The rollers are carried on a pair of radially reciprocable pistons mounted in a feed housing through which the wire is advanced, and a projecting rear portion of the housing has a threaded outer surface for receiving a force-adjusting nut. A conical guide element is slidably mounted on the outer surface of the rear housing portion, and is urged against the adjusting nut by means of a calibrated spring. A pair of symmetrically arranged two-arm levers extend longitudinally through a pair of slits in a flange integral with the housing intermediate its ends, with the rear end of the levers in contact with the conical guide member through a roller, and with the front ends of the levers maintained in abutting relation with the outer ends of the pistons by means of springs. The shaft of a drive motor is fixedly connected to the rear portion of the housing.

4 Claims, 3 Drawing Figures

PLANETARY WIRE-FEEDING MECHANISM FOR ELECTRIC ARC-WELDING APPLICATIONS

CROSS-REFERENCE TO RELATED APPLICATIONS

This application is related to the following copending, coassigned applications filed on even date herewith: (1) Ser. No. 726,280, based on the first-filed Bulgarian application No. 33,773, dated Sept. 24, 1975; (2) Ser. No. 726,278, based on the first-filed Bulgarian application No. 33,772, filed Sept. 24, 1975; (3) Ser. No. 726,424, based on the first-filed Bulgarian application No. 33,771, dated Sept. 24, 1975; and (4) Ser. No. 726,279, based on the first-filed Bulgarian application No. 33,770 dated Sept. 24, 1975.

BACKGROUND OF THE INVENTION

The invention relates to planetary-type wire-feeding mechanisms for converting a rotational motion of a motor shaft to a prescribed linear force along a first axis for selectively advancing an elongated wire.

In one known system of this type suitable, e.g., in electric arc-welding systems, an electrode wire is forwardly advanced along a first axis and through a welding tube by a pair of skewed rollers, such rollers being carried by a pair of pistons which are supported for reciprocation in a radial direction on opposite sides of the feed axis. The rear portion of the housing is connected to the shaft of a drive motor, so that upon a rotation of the motor the resultant turning movement of the housing about its axis will be effective to impart a planetary movement to the skewed rollers. When the pistons are urged inwardly into a wire-engaging position, the skewed surfaces cooperate with the wire to advance the wire in screw thread-like fashion through the welding tube.

In certain such designs, an adjusting nut is engageable with a threaded rear portion of the feed housing, such nut being manually adjustable to vary the force of the skewed rollers on the associated wire in proportion to the degree of turning of the nut.

A disadvantage of the last-mentioned arrangement is that the degree of adjustment by turning the nut is subjective and inexact. In addition, in such scheme, the respective movements of the pistons, and thereby of the skewed rollers, against the opposed surfaces of the advancing wire tend to be uneven and non-symmetrical, leading to binding and inefficiencies of wire feed.

SUMMARY OF THE INVENTION

Such disadvantages are overcome in accordance with the invention by the provision of an improved planetary-type, wire-advancing mechanism of the general type indicated above. In an illustrative embodiment, a conical guide member is supported for sliding engagement over the outer surface of the rear housing portion that receives the adjustment nut on its rear end. The guide member is urged rearwardly against the adjusting nut by means of a calibrated spring, whose front end bears against a radial flange integral with the housing.

The calibrated force on the spring, as controlled by the adjusting nut, is precisely coupled to the skewed rollers in a regular and symmetrical fashion by the provision of a pair of double-arm levers that extend longitudinally in the housing on opposite sides of the feed axis, such levers being respectively fulcrumed on pins that are supported in cutouts machined into the radial flanges of the housing. The corresponding rear surfaces of the levers are coupled, via auxiliary rolling elements, to the outer surface of the conical guiding portion that is urged against the adjusting nut by the calibrated spring. The opposite ends of the levers are maintained in engagement with the radially outer ends of the opposed pistons by means of biasing springs.

The wire-advancing mechanism is enclosed by a pair of cooperating, superposed cover portions that are individually secured to the housing and to the adjusting nut, respectively.

BRIEF DESCRIPTION OF THE DRAWING

The invention is further set forth in the following detailed description taken in conjunction with the appended drawing, in which.

DETAILED DESCRIPTION

Figure 1:
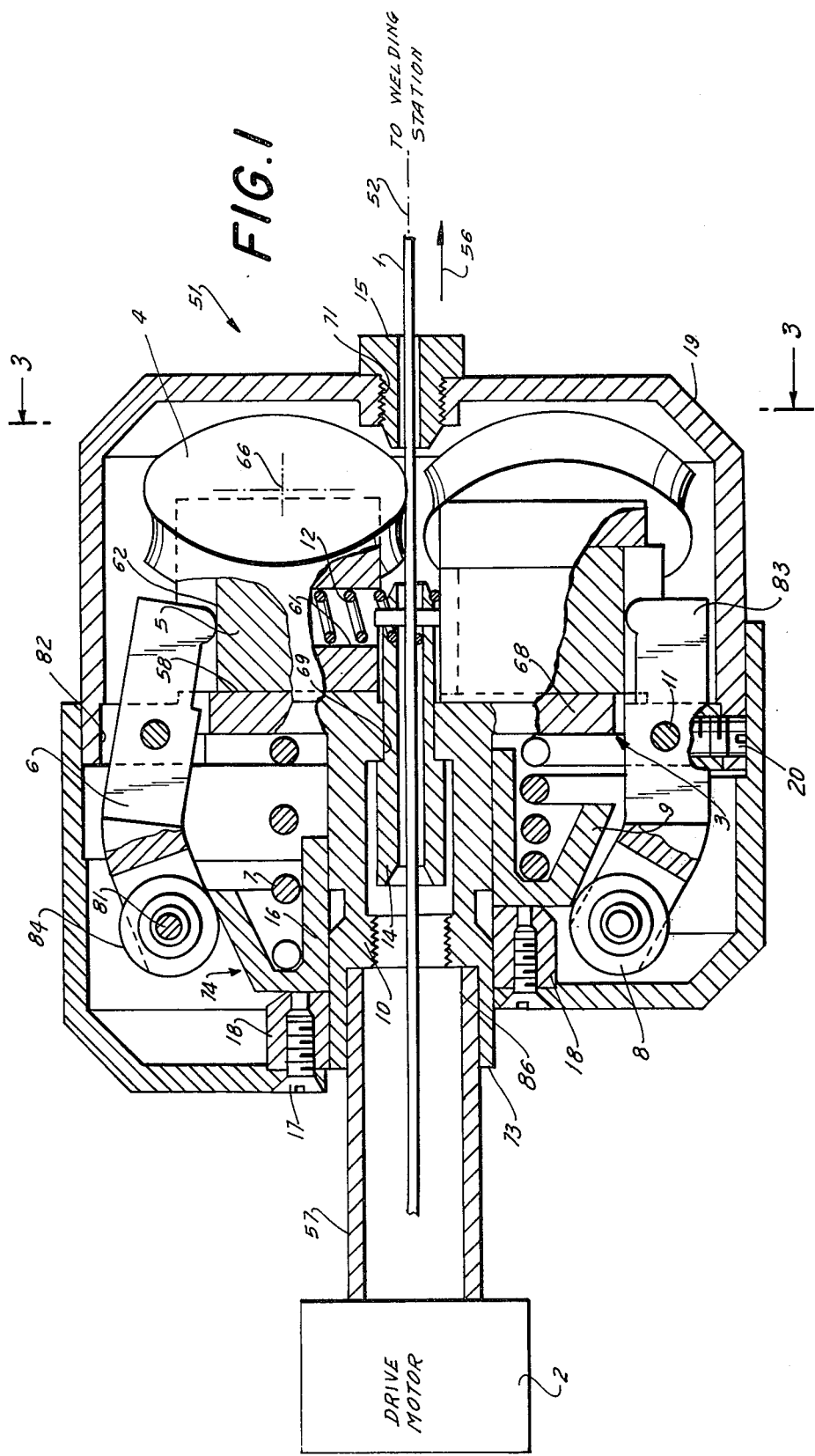
FIG. 1 is a composite view, in longitudinal section, of a planetary-type wire-advancing mechanism constructed in accordance with the invention, with the upper portion of the figure illustrating the mechanism in its wire-engaging position, and the lower portion of the figure illustrating the mechanism in its idle position.

Referring now to the drawing, the numeral 51 represents a planetary-type wire-advancing mechanism which is adapted for propelling a wire electrode 1 along an axis 52 into a welding station, illustratively a welding table of an electric arc-welding apparatus. The mechanism 51 is of the general type that selectively converts a rotational motion of a drive motor 2 into a linear force component tending to advance the wire 1 in a forward direction, represented by an arrow 56, into the welding station. Conventionally, a flexible conduit (not shown) may be associated with the front end of the mechanism 51 for supporting and guiding the wire 1 during its advance. In like manner, a similar conduit may terminate at the rear end of the drive motor 2, which motor has a hollow shaft 57 through which the wire 1 may pass as illustrated.

The mechanism 51 includes a generally cylindrical main housing 3, which includes a forward seat portion 58 adapted to support a pair of pistons 5 for radial reciprocation on opposite sides of the axis 52. Suitable springs 12 are disposed in blind holes 61 within the piston 5 for normally urging a rear surface 62 of the associated piston in a radially outward direction.

Figure 2:
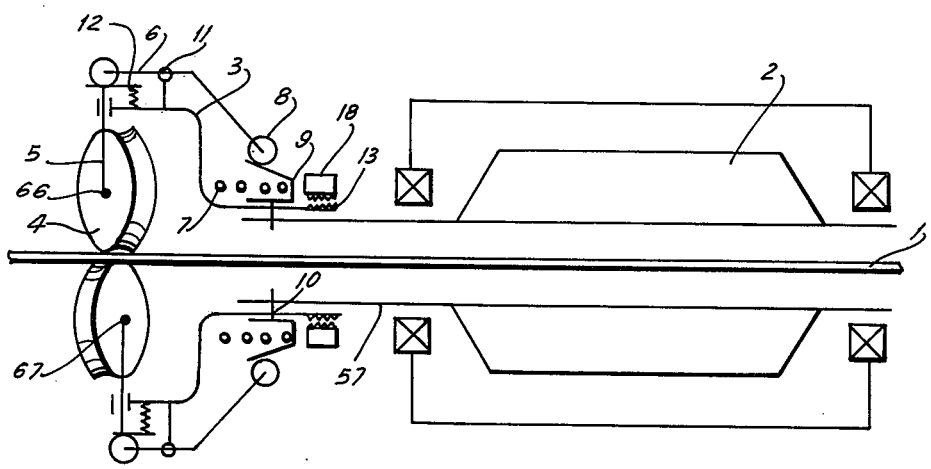
FIG. 2 is a representation of the wire-advancing mechanism of FIG. 1 in schematic form.
Figure 3:
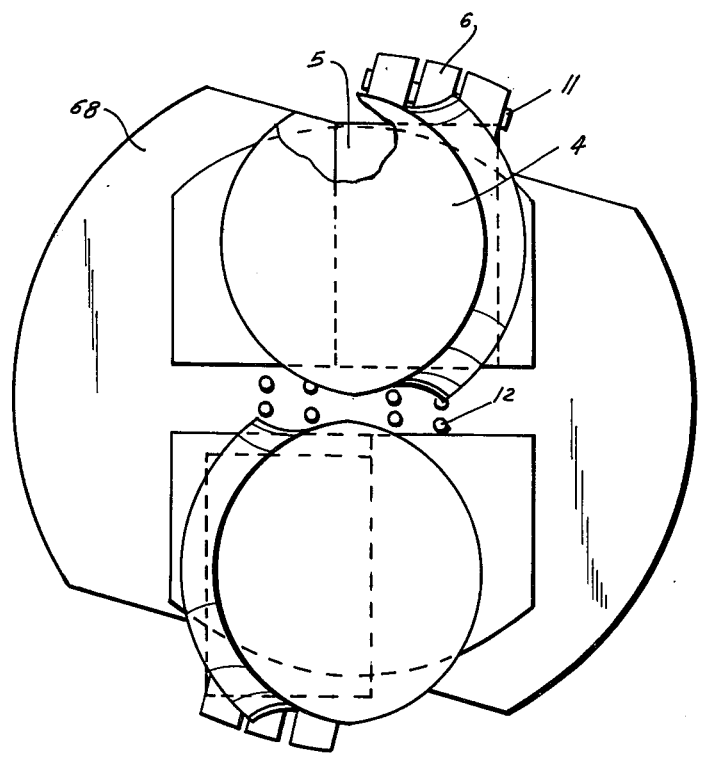
FIG. 3 is a sectional view taken along line 3—3 of FIG. 1.

The pistons 5 respectively carry a pair of skewed rollers 4 for planetary movement around the axis 52 during a rotation of the housing 3. As best shown in FIG. 2, axes 66 and 67 of the respective rollers are skewed at equal and opposite angles with respect to the axis 52, so that when the peripheries of the rollers are moved together by a corresponding radially inward movement of the pistons 5, a simultaneous rotation of the housing 3, which imparts a planetary movement to the rollers 4, will advance the wire 1 in screw thread-like fashion along the axis 52.

The housing 3 further includes a radial flange 68 intermediate its ends, such flange having a central aperture 69 for receiving a rear nozzle 14 concentric with the axis 52. A front nozzle 15, axially aligned with the nozzle 14, is supported in a central aperture 71 of a rearwardly-opening, substantially U-shaped cover member 19, which is disposed in surrounding relation with, and is secured as by screws 20 to, the housing 3. The nozzles 14 and 15 cooperate to guide the wire 1 in its passage through the mechanism 51.

The housing 3 further includes a portion 73 that projects rearwardly from a rear surface of the flange 68. The outer surface of the portion 73 exhibits a thread 13, which is cooperable with a threaded adjustment nut 18. The nut 18 is secured as by screws 17 to a forwardly extending, substantially U-shaped cover portion 16, which is disposed in superposed and sliding relation to the front cover portion 19.

A motion-translating element 74 has a substantially cylindrical inner portion 76 that is slidably mounted on the outer surface of the rear housing portion 73, with the element 74 being disposed axially intermediate the adjusting nut 18 and the rear surface of the housing flange 68.

The element 74 further includes an outer conical guiding portion 9, which is separated from the inner cylindrical portion 76 by means of a radial portion 77. A calibrated compression spring 7 bears against the rear surface of the housing flange 68 and extends rearwardly to engage the radial portion 77 of the translating element 74, thereby urging the element 74 against the adjustment nut 18.

In the disposition shown in the upper portion of FIG. 1, the adjustment nut 18 is situated in its rear-most position, whereby the calibrated spring 7 is in an extended position with a forward, maximum-radius end of the conical guide portion 9 disposed opposite a rear end 81 of a two-armed lever 6. In the position shown in the lower portion of FIG. 1, by contrast, the adjustment nut 18 is shown threaded into a front-most position on the outer surface of the rear housing portion 73, thereby compressing the spring 7 so that a minimum-radius rear portion of the conical guide portion 9 is disposed opposite the end 81 of a second lever 6, which is disposed on the opposite side of the axis 52 from the lever indicated above.

The opposed levers 6 are arranged to provide a uniform and symmetrical force to the pistons 5 to move them into engaging position with the wire 1, thereby avoiding the alignment problems which characterize the uneven roller feeds of the prior art. Each of the opposed levers 6 is pivotally carried on a pin 11, which in turn is disposed in an associated one of two cutouts 82 at the radially outer ends of the flange 68 on opposite sides of the axis 52. Each piston 6 extends longitudinally through the cutout 82, with its rear end 81 being disposed opposite the conical guide portion 9 as indicated before, and with a front end 83 thereof disposed in abutting relation with the outer surface 62 of an adjacent one of the pistons 5. A roller element 84 is rotatably carried on the rear end 81 of each piston for providing positive engagement with the outer surface of the conical guide portion 9, such roller 84 being normally pressed against the conical guide portion 9 due to the upward biasing action of the piston springs 12 on the opposite end.

The motor shaft 57 is provided with a threaded end 86 that tightly engages a complementary threaded portion 10 on the inner surface of the cylindrical portion 76 on the translating element 74.

In the operation of the mechanism 51 as described above, the wire 1 may initially be threaded through the housing 3 while the drive motor is at rest by turning the adjustment nut 18 into its front-most position shown at the bottom of FIG. 1. In this position, each lever is in its fully-biased position, and the mechanism 51 exerts virtually no force against the springs 12. As a consequence, the pistons 5 are in their normal, radially outward position, so that the skewed rollers 4 are separated from the axis 52. Therefore, the wire 18 can be easily threaded through the nozzles 14 and 15.

In order to advance the so-threaded wire, the adjustment nut 18 is threaded back into a desired rear position, whereby a pre-set force, determined by the degree of compression of the calibrated spring 7, can be applied to the pistons 5 via the levers 6. In particular, as the nut 18 is moved backward from the threading position to the operative position in the upper portion of FIG. 1, the calibrated spring 7 correspondingly pushes the conical guide portion 9 in a rearward direction, thereby camming the rear end 81 of the adjacent lever 6 against the force of the piston spring 12. As a result, the rollers 4 bear against the wire 1 with a force that is determined by the resulting compression of the spring 7 and the force ratio of the lever 6.

At this point, the drive motor 2 can be actuated, and the resulting rotation of the housing 3 will cause the prestressed rollers 4 to advance the wire 1 along the axis 52 with a tension determined by the above-mentioned pre-stress force, which can be easily adjusted in a desired manner to accommodate differences in diameter of the wire 1 and/or loading of the mechanism 51.

In the foregoing, an illustrative arrangement of the invention has been described. Many variations and modifications will now occur to those skilled in the art. It is accordingly desired that the scope of the appended claims not be limited to the specific disclosure herein contained.

What is claimed is:

1. In an apparatus for converting the rotational force of a motor shaft to a prescribed linear force along a first axis for selectively advancing an elongated wire along the first axis, a substantially cylindrical hollow feed housing coaxial with the first axis and through which the wire may be advanced in a forward direction along the first axis, the housing having a radial flange intermediate its ends and a rear portion projecting axially rearwardly from the flange, the outer surface of the rear housing portion being threaded at a rear end thereof, first and second pistons supported in a forward portion of the housing on generally opposite sides of the first axis for radial reciprocation toward and away from the first axis, first and second rollers rotatably carried by the respective first and second pistons for planetary rotation about the first axis during a rotation of the housing, the first and second rollers respectively having axes that are skewed with respect to the first axis to cooperate when in an innermost radial position to engage the wire and to advance the wire along the first axis when the first and second rollers are rotated, a conical guide member supported for slidable axial movement on the outer surface of the rear housing portion, an adjustment nut disposed in threaded engagement with the rear end of the rear housing portion, a calibrated spring extending between the flange and the front end of the conical guide member to normally urge such member toward the adjustment nut, first and second levers individually pivoted in the housing intermediate their respective ends on generally opposite sides of the first axis, the first and second levers extending longitudinally in the housing, corresponding first ends of the levers terminating opposite the conical guide member and corresponding second ends of the lever terminating opposite the radially outer ends of the respective first and second pistons, resilient means coupled to each piston for urging the outer end of the piston against the opposed second end of the associated lever, means disposed at the first end of each lever for coupling such first end to the opposed portion of the conical guide member, and means for fixedly connecting the motor shaft to the rear housing portion.

2. Apparatus as defined in claim 1, in which the coupling means comprises a third roller supported at the first end of each lever.

3. Apparatus as defined in claim 1, further comprising first and second covers individually secured to and surrounding the housing and the adjusting nut, respectively.

4. Apparatus as defined in claim 1, in which the motor shaft has a threaded end portion, and in which the connecting means comprises a threaded portion on the inner surface of the rear housing portion for receiving the threaded end portion of the motor shaft.

* * * * *